United States Patent
Fang et al.

(10) Patent No.: US 9,331,786 B2
(45) Date of Patent: May 3, 2016

(54) MANAGING DOWNSTREAM NON-BROADCAST TRANSMISSION IN AN ETHERNET PASSIVE OPTICAL NETWORK (EPON) PROTOCOL OVER COAX (EPOC) NETWORK

(71) Applicant: Futurewei Technologies, Inc., Plano, TX (US)

(72) Inventors: Liming Fang, Santa Clara, CA (US); Jim Chen, Corona, CA (US); Li Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 14/045,629

(22) Filed: Oct. 3, 2013

(65) Prior Publication Data
US 2014/0099113 A1    Apr. 10, 2014

(51) Int. Cl.
*H04J 14/00*    (2006.01)
*H04B 10/27*    (2013.01)
*H04L 27/26*    (2006.01)
*H04Q 11/00*    (2006.01)

(52) U.S. Cl.
CPC ............ *H04B 10/27* (2013.01); *H04L 27/2601* (2013.01); *H04Q 11/0067* (2013.01); *H04Q 11/0071* (2013.01)

(58) Field of Classification Search
CPC .............. H04B 10/27; H04L 27/2601; H04Q 11/0067; H04Q 11/0071
See application file for complete search history.

(56) References Cited

U.S. PATENT DOCUMENTS

| | | | | |
|---|---|---|---|---|
| 7,916,713 B2* | 3/2011 | Mudulodu | ............ | H04L 5/0092 370/349 |
| 8,948,587 B2* | 2/2015 | Fargano | ............ | H04B 10/0791 398/10 |
| 8,989,089 B2* | 3/2015 | Dinan | ............ | H04L 9/0637 340/459 |
| 2005/0243837 A1* | 11/2005 | Boyd | ............ | H04L 45/00 370/395.52 |
| 2010/0215369 A1* | 8/2010 | Effenberger | ............ | H04J 3/1694 398/67 |
| 2011/0058813 A1* | 3/2011 | Boyd | ............ | H04L 12/413 398/68 |
| 2012/0128357 A1* | 5/2012 | Mukai | ............ | H04B 10/272 398/58 |
| 2012/0257892 A1* | 10/2012 | Boyd | ............ | H04Q 11/0067 398/58 |

(Continued)

FOREIGN PATENT DOCUMENTS

WO    2011031831 A1    3/2011

OTHER PUBLICATIONS

Varnese et al; EPoC Architecture considersations; May 2012; IEEE 802.3 Interim session ; pp. 1-12.*

(Continued)

*Primary Examiner* — Ken N Vanderpuye
*Assistant Examiner* — Amritbir Sandhu
(74) *Attorney, Agent, or Firm* — Conley Rose, P.C.; Grant Rodolph; Richard J. Mason

(57) ABSTRACT

An OLT comprising an optical port configured to couple to an optical distribution network, a processor coupled to the optical port and configured to generate a DL-MAP based on non-broadcast downstream bandwidth allocations for a plurality of network units, wherein each of the downstream bandwidth allocations is not assigned to all of the network units, generate an EPON MPCP downstream gate message comprising the DL-MAP, and embed the DL-MAP in the EPON MPCP downstream gate message, and a transmitter coupled to the processor and the optical port, wherein the transmitter is configured to transmit the EPON MPCP downstream gate message to the network units via the PON.

8 Claims, 16 Drawing Sheets

(56) References Cited

U.S. PATENT DOCUMENTS

| | | | | |
|---|---|---|---|---|
| 2012/0257893 | A1* | 10/2012 | Boyd | H04L 12/2801 398/58 |
| 2013/0142515 | A1* | 6/2013 | Chen | H04B 10/27 398/67 |
| 2013/0202286 | A1* | 8/2013 | Boyd | H04B 10/032 398/5 |
| 2013/0202304 | A1* | 8/2013 | Boyd | H04L 12/2801 398/98 |
| 2013/0236177 | A1* | 9/2013 | Fang | H04L 12/2801 398/66 |
| 2013/0236185 | A1* | 9/2013 | Fang | H04L 65/1073 398/115 |
| 2013/0265945 | A1* | 10/2013 | He | H04L 27/2657 370/329 |
| 2013/0272703 | A1* | 10/2013 | Fang | H04L 12/00 398/58 |
| 2013/0322882 | A1* | 12/2013 | Fang | H04J 3/1694 398/67 |
| 2014/0056586 | A1* | 2/2014 | Boyde | H04B 10/27 398/76 |
| 2014/0072304 | A1* | 3/2014 | Boyd | H04B 10/27 398/67 |
| 2014/0099113 | A1* | 4/2014 | Fang | H04Q 11/0067 398/66 |
| 2014/0133859 | A1* | 5/2014 | Fang | H04Q 11/0067 398/76 |
| 2014/0178076 | A1* | 6/2014 | Fang | H04J 14/0238 398/98 |
| 2014/0186025 | A1* | 7/2014 | Fang | H04J 3/0667 398/25 |
| 2014/0186039 | A1* | 7/2014 | Luo | H04L 12/2861 398/66 |
| 2014/0255029 | A1* | 9/2014 | Varanese | H04L 27/2626 398/66 |
| 2014/0301270 | A1* | 10/2014 | Johnsson | H04W 76/021 370/328 |
| 2014/0304500 | A1* | 10/2014 | Sun | H04L 63/0471 713/153 |
| 2014/0314418 | A1* | 10/2014 | Sun | H04B 10/27 398/89 |
| 2015/0016331 | A1* | 1/2015 | Kim | H04J 11/005 370/312 |
| 2015/0103683 | A1* | 4/2015 | Kim | H04W 24/02 370/252 |
| 2015/0104173 | A1* | 4/2015 | Sun | H04Q 11/0071 398/67 |
| 2015/0131565 | A1* | 5/2015 | Nakashima | H04L 1/0026 370/329 |

OTHER PUBLICATIONS

"Broadcom Introduces DOCSIS-Based EoC for EPON Product Portfolio in Support of China's Network Convergence," Press Release; http://www.broadcom.com/press/release.php?id-s523445, Oct. 27, 2010, 2 pages.

"Operating the EPON Protocol Over Coaxial Distribution Networks Call for Interest," IEEE 802.3 Ethernet Working Group, Nov. 8, 2011, Atlanta, Georgia, 38 pages.

Foreign Communication From a Counterpart Application, PCT Application No. PCT/US2013/063293, Invitation to Pay Additional Fees dated Dec. 12, 2013, 7 pages.

Foreign Communication From a Counterpart Application, PCT Application No. PCT/US2013/063293, International Search Report dated Mar. 12, 2014, 7 pages.

Foreign Communication From a Counterpart Application, PCT Application No. PCT/US2013/063293, Written Opinion dated Mar. 12, 2014, 8 pages.

Shellhammer, "Project Authorization Request (PAR) Recommendation," IEEE Draft, vol. 802.3.epoc, XP017751945, Jan. 25, 2012, 11 pages.

Varanese, N., et al., "EPoC Architecture Considerations," IEEE 802.3 Interim Session, XP002713589, May 15-16, 2012, 13 pages.

Boyd, M., S., "EPOC Upstream TDMA Slot Mapping," IEEE Draft, XP068021217, vol. 802.3.epoc, May 4, 2012, 9 pages.

Hangzhou, "Broadcom Introduces DOCSIS-based EoC for EPON Product Portfolio in Support of China's Network Convergence," Press Release, Oct. 27, 2010, 2 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, 802.3av, Oct. 30, 2009, 236 pages.

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Std 802.3ah, Sep. 7, 2004, 640 pages.

* cited by examiner

700 →

Grant Table

| LLID | Start time (TQs) | Length (bytes) |
|---|---|---|
| 1 | 0 | 512 |
| 2 | 512 | 512 |
| 3 | 3,000 | 1,024 |
| 4 | 6,000 | 1,024 |

1800 ──▶

```
Algorithm. DL-MAP generation.

DSYM_COUNTER                                              ; downstream symbol counter
num_PRB                                                   ; number of PRBs in a symbol
bits_per_PRB[LLID]                                        ; bit-loading table
FRAME : {LLID, length}                                    ; format of Ethernet frame
DL_MAP[SYM_NO][PRB_NO]                                    ; format of DL-MAP DSYM_COUNTER = (DSYM_COUNTER + 1) % 75                    ; point to next symbol while (PRB table is not empty)
        Frame = get the next frame from the PON buffer for (i = 0; DL_MAP[DSYM_COUNTER][i] != 0; i = i + 1)    ; find empty PRB in symbol
        end for needed = Frame length                             ; get the length of the frame while (needed > 0)                                ; allocate PRBs for entire grant
                DL_MAP[DSYM_COUNTER][i] = Frame LLID    ; allocate PRB to LLID
                needed = needed – bits_per_PRB[LLID]
        end while
end while
```

FIG. 18

MANAGING DOWNSTREAM NON-BROADCAST TRANSMISSION IN AN ETHERNET PASSIVE OPTICAL NETWORK (EPON) PROTOCOL OVER COAX (EPOC) NETWORK

CROSS-REFERENCE TO RELATED APPLICATIONS

The present application claims priority to U.S. Provisional Patent Application No. 61/710,196 filed Oct. 5, 2012 by Liming Fang, et al and entitled "Methods and Apparatus of Managing Downstream Burst (or Non-Broadcast) Transmission in an Ethernet Passive Optical Network (EPON) Protocol over Coax (EPoC) Network", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile". PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference. In EPON, upstream bandwidths may be shared among multiple customer premises, whereas downstream traffic may only be broadcast. As such, there is a need in the art for mechanisms to manage downstream transmission in non-broadcast (e.g. unicast or multi-cast) mode.

SUMMARY

In one embodiment, the disclosure includes an optical line terminal (OLT) comprising an optical port configured to couple to an optical distribution network, a processor coupled to the optical port and configured to generate a downlink map (DL-MAP) based on non-broadcast downstream bandwidth allocations for a plurality of network units, wherein each of the downstream bandwidth allocations is not assigned to all of the network units, generate an EPON multi-point control protocol (MPCP) downstream gate message comprising the DL-MAP, and embed the DL-MAP in the EPON MPCP downstream gate message, and a transmitter coupled to the processor and the optical port, wherein the transmitter is configured to transmit the EPON MPCP downstream gate message to the network units via the PON.

In another embodiment, the disclosure includes a method for managing downstream transmission in an EPoC network comprising generating a DL-MAP based on non-broadcast downstream bandwidth allocations for a plurality of network units, wherein each of the downstream bandwidth allocations is not assigned to all of the network units, generating an EPON MPCP frame comprising an EPON MPCP downstream gate message and a preamble field, inserting the DL-MAP in the preamble field, and sending the EPON frame to the network units.

In another embodiment, the disclosure includes an apparatus comprising an optical port configured to couple to an optical distribution network; and a processor coupled to the optical port and configured to construct a downstream frame comprising one or more downstream bursts, and insert burst markers between the downstream bursts, wherein the downstream bursts are associated with different network units.

In another embodiment, the disclosure includes an apparatus comprising an optical port configured to couple to an optical distribution network; and a processor coupled to the optical port and configured to retrieve an Ethernet frame, search empty downlink Physical Resource Blocks (PRBs) in a next Orthogonal Frequency Division Multiplexing (OFDM) downlink symbol in a downlink PRB table, allocate a set of downlink PRBs to a Logical Link Identifier (LLID) according to a length of the Ethernet frame, and insert the next OFDM downlink symbol, a first empty downlink PRB, and the set of downlink PRBs for the allocation into a DL-MAP.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 18 is an embodiment of an exemplary algorithm for DL-MAP generation.

DETAILED DESCRIPTION

Figure 1:
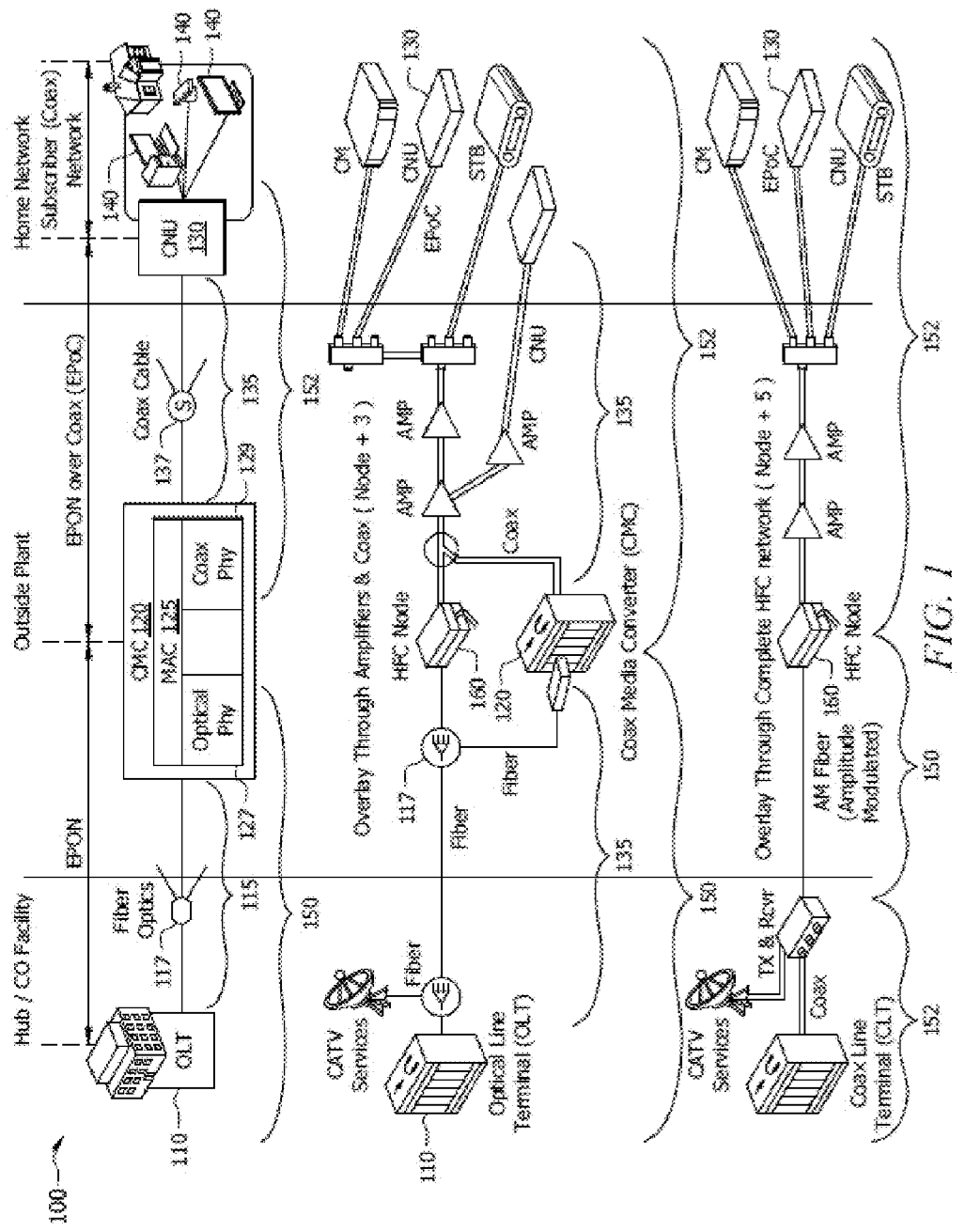
FIG. 1 is a schematic diagram of unified optical-coaxial networks according to embodiments of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON may be a P2MP network comprising an OLT at a central office, an ODN, and a plurality of optical network units (ONUs) at customer premises. EPON may be a PON standard developed by the IEEE and specified in IEEE documents 802.3ah and 802.3av, both of which are incorporated herein by reference. The OLT may implement an EPON Media Access Control (MAC) layer for transmission of Ethernet frames. MPCP may be employed to perform bandwidth assignment, bandwidth polling, auto-discovery, and ranging. Ethernet frames may be broadcast downstream based on a LLID embedded in a preamble frame. Upstream bandwidth may be assigned based on an exchange of Gate and Report messages between an OLT and an ONU.

Ethernet over Coaxial (EoC) may describe any technology which can be used for transmission of Ethernet frames over a coaxial network. Other than Data Over Cable Service Interface Specification (DOCSIS), all EoC technologies transmit Ethernet Frames in the MAC layer. EoC technologies may include, for example, Multimedia over Coax Alliance (MoCA), Home Grid (G.hn), Home Phoneline Networking Alliance (HPNA), and Home Plug Audio/Visual (A/V). EoC has been adapted to run outdoor coaxial (coax) access from an ONU to an EoC head end connected to Customer Premises Equipment (CPE) located in subscribers' homes. There may be a rising trend which support the use of Ethernet PON as an access system to interconnect with multiple coax cables to terminate the Coax Network Units (CNUs) located in the subscribers' homes with an Ethernet PON Protocol over Coax (EPoC) network system.

An EPoC system may be a hybrid access network employing both optical and coaxial technologies. The EPoC may comprise two segments: an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A Fiber Coaxial Unit (FCU) may merge the interface between the PON segment and the coaxial segment of the network. The FCU may be a single box unit that may be located where an ONU and a coaxial line terminal (CLT) are fused together, for example, at a curb or at a basement of an apartment building.

In an EPON architecture, an OLT may allocate upstream bandwidths to the connected ONUs or CNUs for upstream transmissions, while an OLT may only support downstream transmission in broadcast mode. In addition, there may be a rising demand in delivering data and/or services to CPEs based on subscriptions. Consequently, there is a need in the art for a solution to support downstream transmission in non-broadcast mode in an EPON or an EPoC network.

Disclosed herein are mechanisms for sending non-broadcast downstream traffic to a specific ONU or a group of ONUs in an EPON or a specific CNU or a group of CNUs in an EPoC network. A MPCP downstream gate message may be used to convey a downstream traffic schedule. Downstream traffic schedule may be in the form of a DL-MAP, which may specify locations (e.g. in time-frequency slot) of downstream bursts and corresponding recipients. In one embodiment, an OLT may embed a DL-MAP in the message body of a MPCP downstream gate message. In another embodiment, an OLT may embed a DL-MAP in the preamble field of an EPON frame carrying a MPCP downstream gate message. In a third embodiment, an OLT or a FCU may insert burst markers in a data frame to separate downstream bursts, instead of employing a DL-MAP. In a fourth embodiment, an OLT or a FCU may generate an OFDM DL-MAP and include the DL-MAP within an OFDM frame. The disclosed embodiments may allow conventional EPON ONUs to coexist with CNUs. It should be noted that in the present disclosure, the terms "FCU", "coaxial media converter" ("CMC"), and "CLT" may be equivalent and may be used interchangeably.

FIG. 1 illustrates three embodiments of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a CMC 120 positioned between the OLT 110 and the CNU 130, e.g., between the optical portion 150 and the coaxial portion 152. The OLT 110 may be coupled via an ODN 115 to the CMCs 120, and optionally to one or more ONUs, or one or more Hybrid Fiber Coaxial (HFC) nodes 160 in the optical portion 150. The ODN 115 may comprise fiber optics and an optical splitter 117 and/or a cascade of 1×M passive optical splitters that couples OLT 110 to the CMC 120 and any ONUs. The value of M in EPoC, e.g. the number of CMCs, may for example be 4, 8, 16, or other values and may be selected by the operator depending on factors such as optical power budget. The CMC 120 may be coupled to the CNUs 130 via an electrical distribution network (EDN) 135, which may comprise a cable splitter 137, a cascade of taps/splitters, and/or one or more amplifiers. Each OLT port may serve 32, 64, 128 or 256 CNUs 130. It should be noted that the upstream transmissions from CNUs may only reach the CMC 120 and not the other CNUs 130 due to a directional property of the tap. The distances between the OLT 110 and the ONUs and/or CMCs 120 may range from about 10 to about 20 kilometers, and that between the CMC 120 and CNUs 130 may range from about 100 to about 500 meters. The unified optical-coaxial network 100 may comprise any number of HFCs 160, CMCs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that the optical portion 150 may be a communication network that does not require active components to distribute data between the OLT 110 and the CMC 120. Instead, the optical portion 150 may use the passive optical components in the ODN 115 to distribute data between the OLT 110 and the CMC 120. Examples of suitable protocols that may be implemented in the optical portion 150 may include ATM PON (APON) or broadband PON (BPON) defined by the ITU Telecommunication Standardization Sector (ITU-T) document G.983, Gigabit PON (GPON) defined by the ITU-T document G.984, the EPON defined by the Institute of Electronics and Electrical Engineers (IEEE) documents 802.3ah and 802.3av, and the wavelength division multiplexing (WDM) PON (WDM-PON), all of which are incorporated by reference as if reproduced in their entirety.

The OLT 110 may be any device configured to communicate with the CNUs 130 via the CMC 120. The OLT 110 may act as an intermediary between the CMCs 120 and/or CNUs 130 and another network. The OLT 110 may forward data received from the other network to the CMCs 120 and/or CNUs 130 and forward data received from the CMCs 120 or CNUs 130 onto the other network. Although the specific configuration of the OLT 110 may vary depending on the type of optical protocol implemented in the optical portion 150, in an embodiment, OLT 110 may comprise an optical transmitter and an optical receiver. When the other network employs a network protocol that is different from the protocol used in the optical portion 150, OLT 110 may comprise a converter that may convert the other network protocol into the protocol of the optical portion 150. The OLT converter may also convert the optical portion 150 protocol into the other network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the CMC 120. It should be noted that the optical fiber cables may be replaced by any optical transmission media in some embodiments. In some embodiments, the ODN 115 may comprise one or more optical amplifiers. The ODN 115 may extend from the OLT 110 to the CMC 120 and any optional ONUs in a branching configuration as shown in FIG. 1, but may be alternatively configured as determined by a person of ordinary skill in the art.

The CMC 120 may be any device or component configured to forward downstream data from the OLT 110 to the corresponding CNUs 130 and forward upstream data from the CNUs 130 to the OLT 110. The CMC 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the CMC 120 may encapsulate or frame the data in the optical portion 150 and the coaxial portion 152 differently. In an embodiment, the CMC 120 may include a MAC layer 125 and physical (PHY) layers, corresponding to the type of signals carried over the respective media. The MAC layer 125 may provide addressing and channel access control services to the PHY layers. As such, the PHY may comprise an optical PHY 127 and a coaxial PHY 129. In many embodiments, the CMC 120 may be transparent to the CNU 130 and OLT 110 in that the frames sent from the OLT 110 to the CNU 130 may be directly addressed to the CNU 130 (e.g. in the destination address), and vice-versa. As such, the CMC 120 may intermediate between network portions, namely an optical portion 150 and a coaxial portion 152 in the example of FIG. 1.

The coaxial portion 152 of the unified electrical and coaxial network 100 may be similar to any known electrical communication system. The coaxial portion 152 may not require any active components to distribute data between the CMC 120 and the CNU 130. Instead, the coaxial portion 152 may use the passive electrical components in the coaxial portion 152 to distribute data between the CMC 120 and the CNUs 130. Alternatively, the coaxial portion 152 could use some active components, such as amplifiers. Examples of suitable protocols that may be implemented in the coaxial portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the CMC 120 and the CNU 130. It should be noted that the electrical cables may be replaced by any electrical transmission media in some embodiments. In some embodiments, the EDN 135 may comprise one or more electrical amplifiers. The EDN 135 may extend from the CMC 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the CMC 120, and any subscriber devices 140. The CNU 130 may act as an intermediary between the CMC 120 and the subscriber devices 140. For instance, the CNU 130 may forward data received from the CMC 120 to the subscriber devices 140, and may forward data received from the subscriber devices 140 toward the OLT 110. Although the specific configuration of the CNUs 130 may vary depending on the type of unified optical-coaxial network 100, in an embodiment, the CNUs 130 may comprise an electrical transmitter configured to send electrical signals to the CMC 120 and an electrical receiver configured to receive electrical signals from the CMC 120. Additionally, the CNUs 130 may comprise a converter that may convert CMC 120 electrical signals into electrical signals for the subscriber devices 140, such as signals in IEEE 802.11 wireless local area network (Wi-Fi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscriber devices 140 may include desktop computers, laptop computers, tablets, mobile telephones, residential gateways, televisions, set-top boxes, and similar devices.

Figure 2:
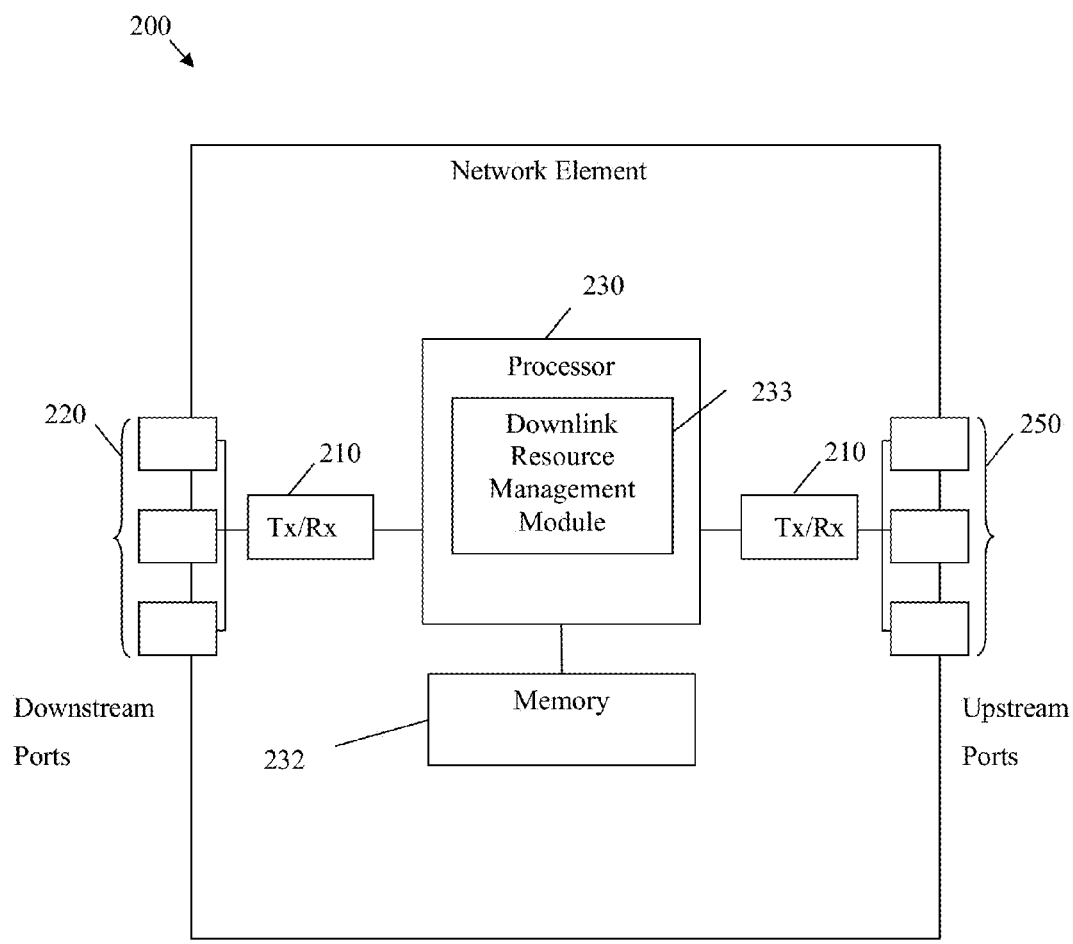
FIG. 2 is a schematic diagram of an embodiment of a network element.

FIG. 2 is a schematic diagram of an embodiment of a Network Element (NE) 200, which may correspond to or may be located at an OLT 110 or a FCU 120. In some embodiments NE 200 may also act as other node(s) in the network, e.g. network 100. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a downlink resource management module 233, which may assign downlink resources to provision for downlink resource sharing among multiple users (e.g. CNUs 130 and/or ONUs). For example, the downlink resource management module 233 may generate an EPON MPCP gate message carrying a DL-MAP as described below with respect to FIGS. 5 and 8, perform MPCP gate translation as described in method 600 of FIG. 6, insert burst markers as described below with respect to FIGS. 10-14, or generate an OFDM DL-MAP as described in method 17 of FIG. 17. In an alternative embodiment, the downlink resource management module 233 may be implemented as instructions stored in the memory module 232, which may be executed by the processor 230. The memory module 232 may comprise a cache for temporarily storing content, e.g., a Random Access Memory (RAM). Additionally, the memory module 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or the memory module 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
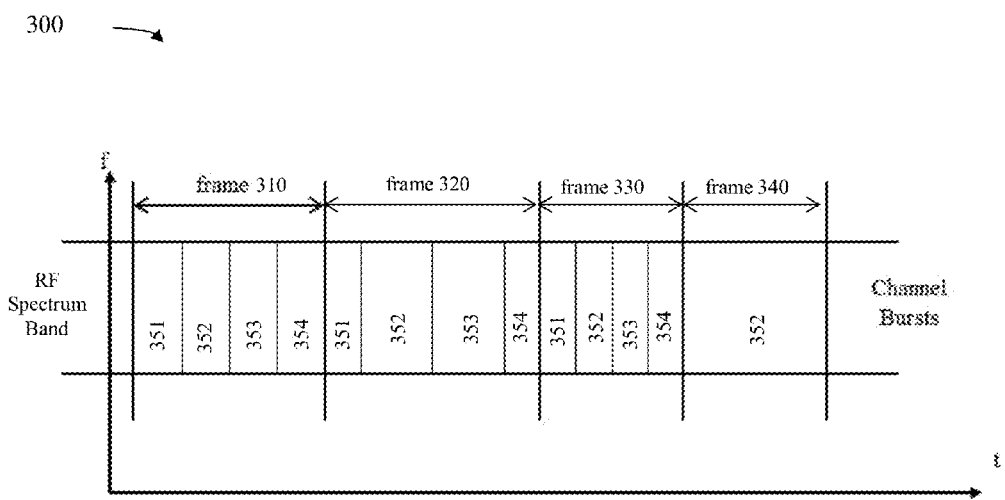
FIG. 3 is a schematic diagram of an embodiment of a downstream traffic pattern.

FIG. 3 is a schematic diagram of an embodiment of a downstream traffic pattern 300 in a RF spectrum band (e.g. in DOCSIS 3.1). In FIG. 3, the x-axis may represent time and the y-axis may represent frequency. Downstream traffic pattern 300 may comprise downstream bursts for channels 351, 352, 353, and 354. Downlink resources may be shared among multiple channels in an OFDM frame. For example, OFDM frame 310 may carry one downstream burst for each of the channels 351-354. As such, the maximum latency may be one OFDM frame time. In addition, downlink resources may be allocated based on traffic needs. For example, downstream bursts within an OFDM frame may have variable sizes as shown in OFDM frame 320, and OFDM frames may have variable lengths as shown in OFDM frames 310 and 330. In addition, an OFDM frame may carry as few as one downstream burst when there is data for only one channel as shown in OFDM frame 340.

Figure 4:
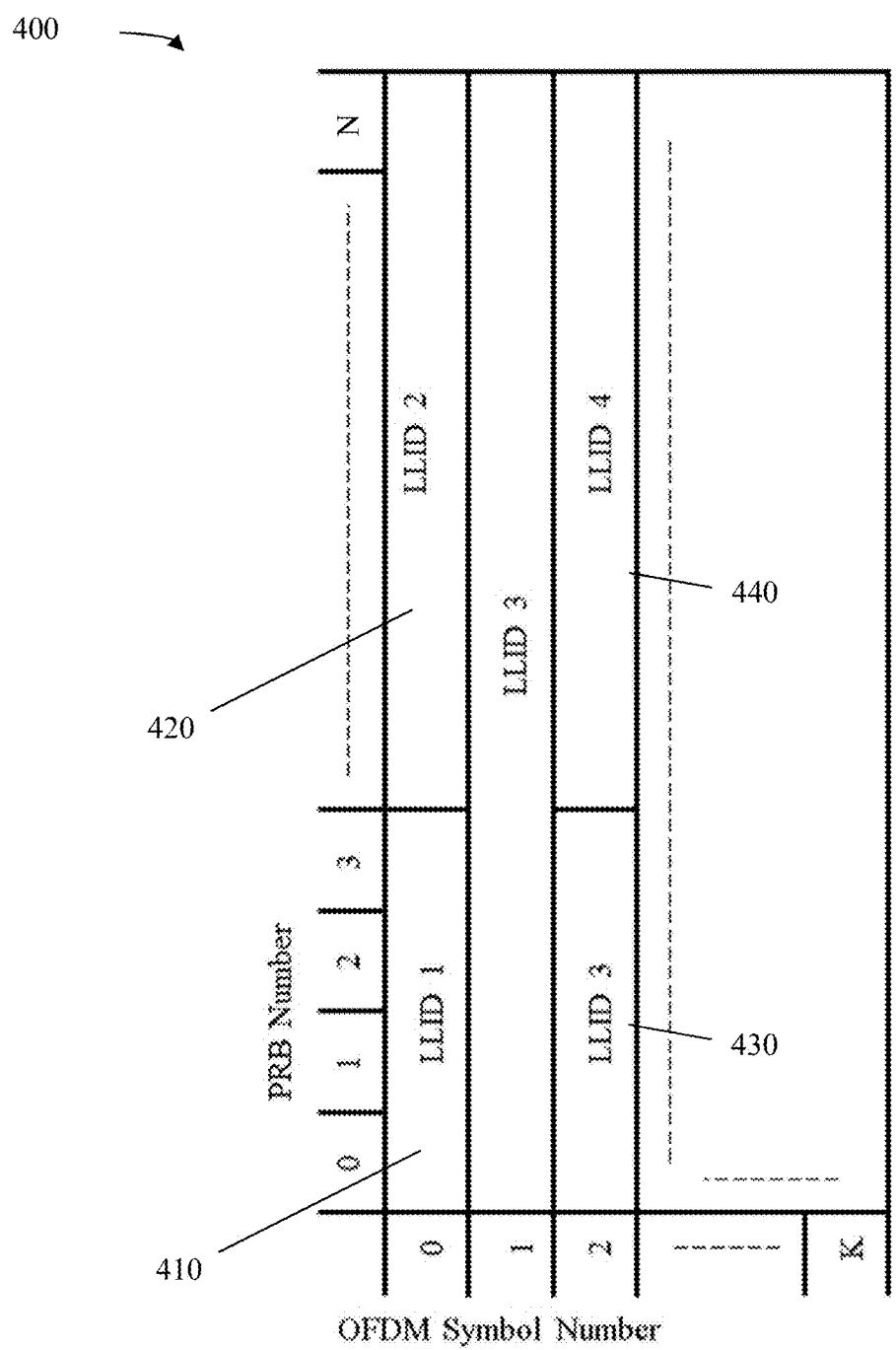
FIG. 4 is a schematic diagram of an embodiment of an EPoC downstream OFDM frame.

FIG. 4 is a schematic diagram of an embodiment of an EPoC downstream OFDM frame 400. FIG. 4 illustrates the sharing of OFDM resources among multiple users in 2-dimensional time-frequency slots. In FIG. 4, the x-axis may represent time and the y-axis may epresent frequency. OFDM frame 400 may comprise K+1 OFDM symbols varying from 0 to K in time and each symbol may comprise N+1 PRBs varying from 0 to N in frequency. Each PRB may further comprise a group of sub-carriers. The sub-carriers may be used to transmit data. An OFDM allocation may be specified in terms of a starting location within an OFDM frame and a length of the allocation. The starting location may be described by an OFDM symbol number and a PRB number within the starting OFDM symbol. The length of the allocation may be described by the number of PRBs which may be used to carry downstream data sent from an OLT to a CNU. An OLT may assign continuous PRBs to the same CNU (or LLID) as shown in burst 410 for LLID 1. An OLT may assign downstream resources for multiple users in an OFDM frame. For example, OFDM frame 400 may carry downstream burst 410 for LLID 1, downstream burst 420 for LLID 2, downstream burst 430 for LLID 3, and downstream burst 440 for LLID 4.

Figure 5:
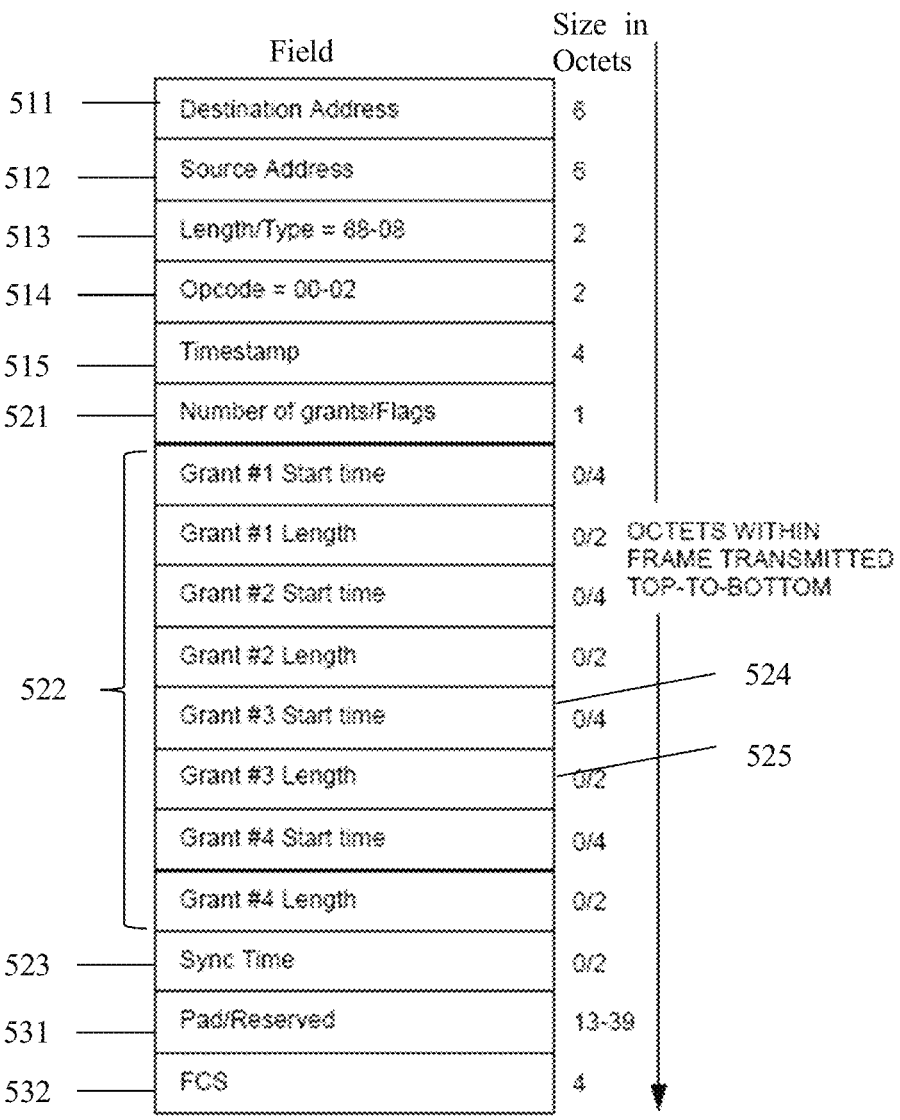
FIG. 5 is a schematic diagram of an embodiment of a MPCP downstream gate message.

FIG. 5 illustrates an embodiment of a MPCP downstream gate message 500. The MPCP downstream gate message 500 may be used to convey one or more downstream grants that are addressed to a specific ONU or CNU according to a LLID. Each downstream grant may be specified in terms of a grant start time and a grant length according to a downstream bandwidth allocation specified by a downstream scheduler. The grant start time may correspond to a time within an available downstream bandwidth when a downstream transmission window begins. The grant length may correspond to the duration of the downstream transmission window within the available bandwidth. The downstream data may be transmitted during the specified transmission window. MPCP downstream gate message 500 may be similar to the current MPCP gate message used for upstream allocations. For example, MPCP downstream gate message 500 may comprise a destination address field 511, a source address field 512, a length/type field 513, an opcode field 514, a timestamp field 515, a number of grants field 521, a downstream grants field 522, a sync time field 523, a variable zero padding field 531, and a frame check sequence (FCS) field 532. The number of grants field 521 may specify the number of downstream grants in the downstream grants field 522. The downstream grants field 522 may comprise one or more downstream grants. Each downstream grant may comprise a grant start time 524 and a grant length 525.

Figure 6:
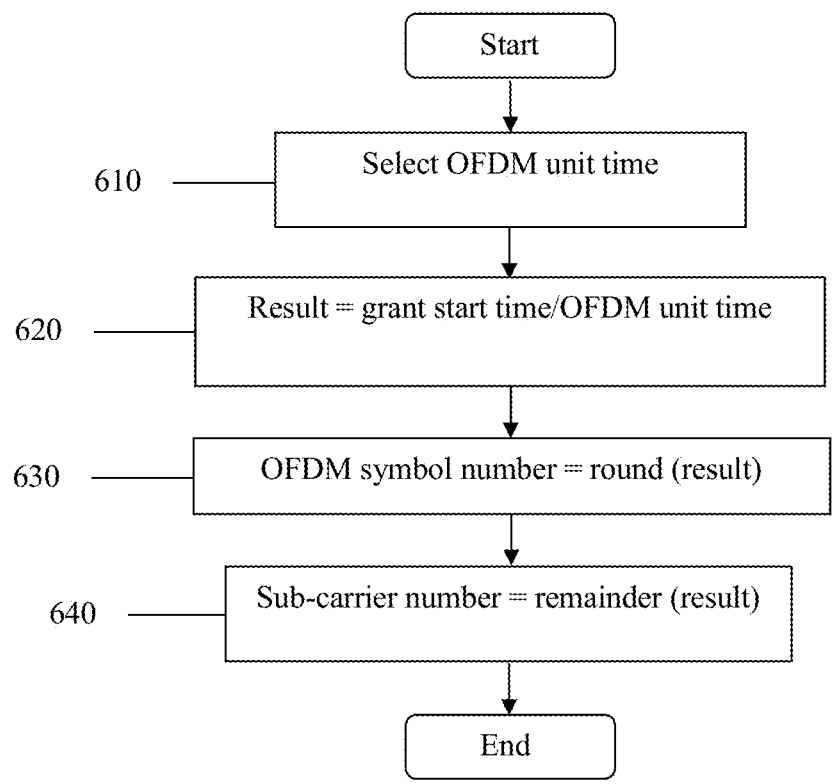
FIG. 6 is a flowchart of an embodiment of a MPCP downstream gate conversion method.

FIG. 6 illustrates a flowchart of an embodiment of a downstream gate conversion method 600. Method 600 may be implemented at a FCU (e.g. FCU 120 of FIG. 1) when forwarding downstream data received from an OLT (e.g. OLT 110) to CNUs (e.g. CNUs 130). Method 600 may convert a downstream gate in units of time quanta (TQ) to an OFDM resource map in terms of OFDM symbol number and sub-carrier number. Method 600 may begin with selecting an OFDM unit time as shown in step 610. An OFDM unit time may include the time duration of an OFDM symbol and a cyclic prefix (CP). The OFDM unit time may be selected as multiple of TQs. After selecting an OFDM unit time, method 600 may determine a starting location of a downstream burst within an OFDM frame. At step 620, method 600 may divide the grant start time by the selected OFDM unit time. The grant start time may be obtained from a downstream grant sent by an OLT. At step 630, method 600 may compute the starting OFDM symbol number by rounding the result obtained from the division in step 620. The OFDM symbol number computation may be expressed as below:

$$OFDM \text{ symbol number} = \text{round}\left(\frac{\text{Grant start time}}{OFDM \text{ unit time}}\right) \quad (1)$$

At step 640, method 600 may compute the sub-carrier number by taking the remainder of the result obtained from the division in step 620. The sub-carrier number computation may be expressed as below:

$$OFDM \text{ symbol number} = \text{remainder}\left(\frac{\text{Grant start time}}{OFDM \text{ unit time}}\right) \quad (2)$$

For example, a TQ may be about 16 nanoseconds (ns), and an OFDM unit time may be selected as about 48 microseconds (μs). Thus, the OFDM unit time may be about 3,000 TQs. A downstream grant start time may be represented by an integer of about 32 bits in length. The OFDM symbol number for a downstream grant start time with a timestamp "x" may be computed by rounding x divided by about 3,000 according to equation (1). The OFDM sub-carrier number may be computed by taking the remainder of x divided by about 3,000 according to equation (2). A downstream grant length may be represented by an integer of about 16 bits in length and may indicate the number of OFDM sub-carriers in an allocation.

Figures 7, 8:
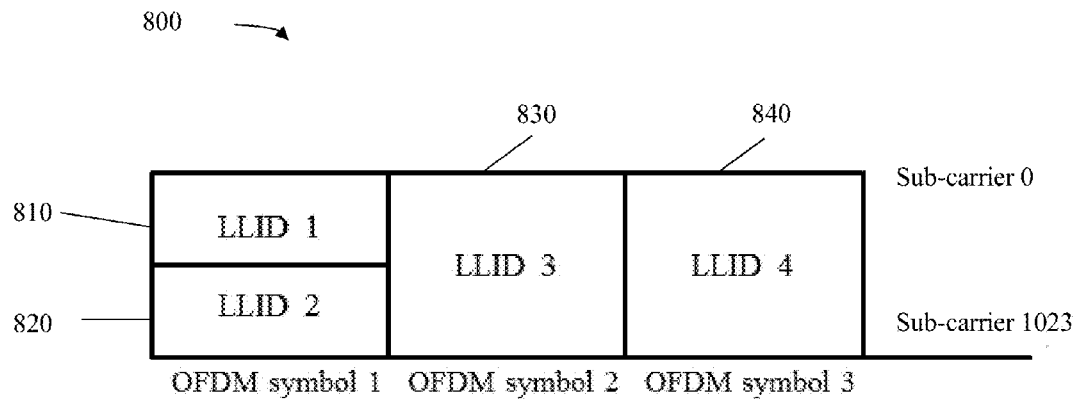
FIG. 7 is a table of an embodiment of a grant table for downlink allocations.
FIG. 8 is a schematic diagram of an embodiment of an OFDM frame with downlink allocations corresponding to the grant table in FIG. 7.

FIG. 7 illustrates an example embodiment of a grant table 700. Grant table 700 may list four downstream grants for LLID 1, 2, 3, and 4, and their corresponding grant start time in units of TQs and grant lengths in units of bytes. A FCU may obtain such grant table 700 from a MPCP downstream gate message (e.g. MPCP downstream gate message 500 of FIG. 5) sent by an OLT.

FIG. 8 illustrates an embodiment of a downstream OFDM frame 800 with downstream bursts for LLID 1, 2, 3, and 4 positioned corresponding to the downstream grants listed in grant table 700 of FIG. 7. In this example embodiment, OFDM frame 800 may comprise 1024 sub-carriers per OFDM symbol and an OFDM unit time of about 3,000 TQs. Thus, downstream burst 810 for LLID 1 and downstream burst 820 for LLID 2 may be carried in OFDM symbol 1, downstream burst 830 for LLID 3 may be carried in OFDM symbol 2, and downstream burst 840 for LLID 4 may be carried in OFDM symbol 3.

Figure 9:
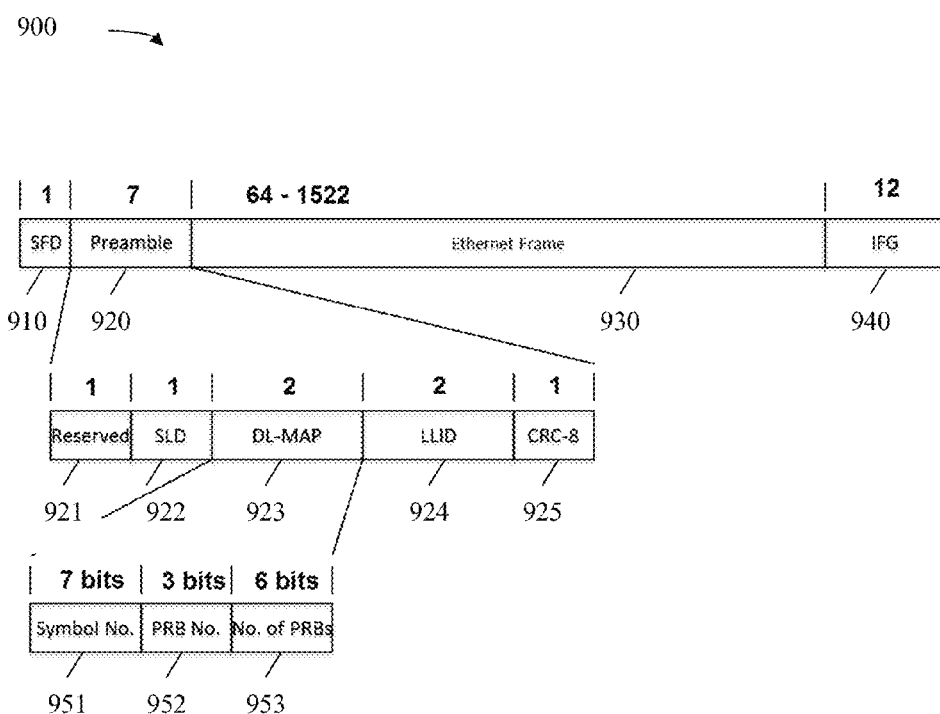
FIG. 9 is a schematic diagram of an embodiment of an EPON MPCP frame embedding a DL-MAP in the preamble field.

FIG. 9 illustrates an embodiment of an EPON MPCP frame 900 with a DL-MAP embedded in the preamble field. Recall that in FIG. 4 an OFDM downstream resource map may be described by a tuple of {starting symbol number, starting PRB number, number of PRBs allocated}. For example, a 3-tuple {40, 4, 28} may represent an allocation for a particular LLID with 28 PRBs starting from PRB number 4 of symbol number 40. The tuple may be represented by about 2 bytes. For example, the symbol number, the PRB number, and the number of PRBs may be represented by about 7-bits, about 3-bits, and about 6-bits, respectively. There are currently available bytes in the EPON preamble field of MPCP gate messages. Thus, the tuple may be embedded in the preamble field.

For example, EPON MPCP frame 900 may comprise a start of frame delimiter (SFD) field 910, a preamble field 920, an Ethernet frame 930, and an Inter-Frame Gap (IFG) 940. The Ethernet frame 930 may carry a MPCP downstream gate message. The DL-MAP may be embedded in the preamble field 920. The preamble field 920 may comprise a reserved field 921, a start of LLID delimited (SLD) field 922, a DL-MAP field 923, a LLID field 924, and an 8-bits CRC (CRC-8) field 925. The DL-MAP field 923 may be about 2 octets long and may comprise a symbol number field 951 of about 7-bits long, a PRB number field 952 of about 3-bits long, and a number of PRBs field 953 of about 6-bits long. It should be noted that the lengths of the symbol number field 951, PRB number field 952, and number of PRBs field 953 may vary and may be defined according to deployment scenario.

In another embodiment, burst markers may be used to separate downstream bursts for different ONUs or CNUs without specifying the locations of downstream bursts as in the case of employing a DL-MAP. Burst markers may be inserted by a CLT or a FCU when forwarding downstream data received from an OLT. Alternatively, an OLT located at a central office equipped with FCU functionalities may insert burst markers when sending downstream bursts to ONUs or CNUs. Burst markers may be constructed from a specially designed sequence and may be transmitted in the sub-carriers. Burst markers may indicate a start or an end of a downstream burst. Burst markers may be positioned in various configurations, such as non-uniformly distributed across a downstream OFDM frame depending on the size of downstream bursts, and/or staggered in 1 or more sub-carriers across symbols, and/or vary from frames to frames. In addition, burst markers may be protected by adding a CRC sequence. FIGS. 10-14 below may illustrate various examples of downstream OFDM frame views employing burst markers to separate downstream bursts. In FIGS. 10-14, the x-axis may represent time and the y-axis may represent frequency. Each OFDM frame may span 8 symbols in time and 16 sub-carriers in frequency. Burst markers may be indicated by gray colored blocks and downstream bursts may be indicated by white colored blocks.

Figure 10:
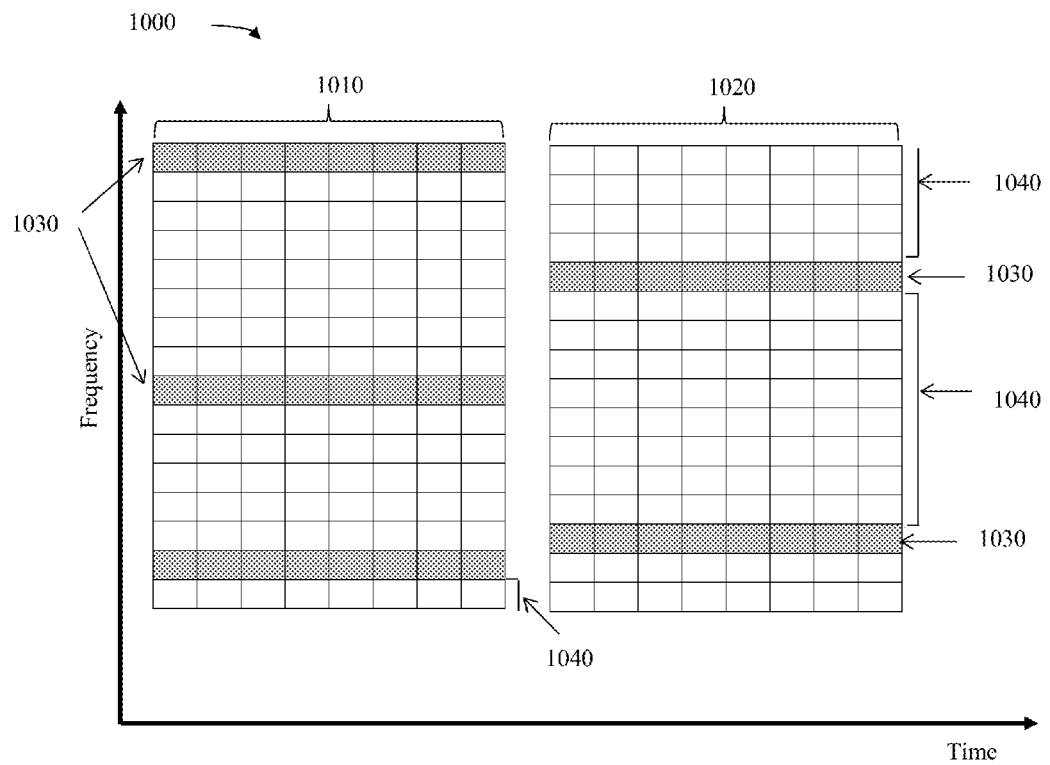
FIG. 10 is a schematic diagram of an embodiment of an OFDM frame view employing burst markers to separate downstream bursts.

FIG. 10 is a schematic diagram of an embodiment of a downstream OFDM frame view 1000 employing burst markers to separate downstream bursts. In downstream OFDM frame view 1000, downstream bursts 1040 in OFDM frames 1010 and 1020 may be separated by burst markers 1030. Also, burst markers may be positioned non-uniformly in a OFDM frame and vary between frames as shown in downstream OFDM frame view 1000.

Figure 11:
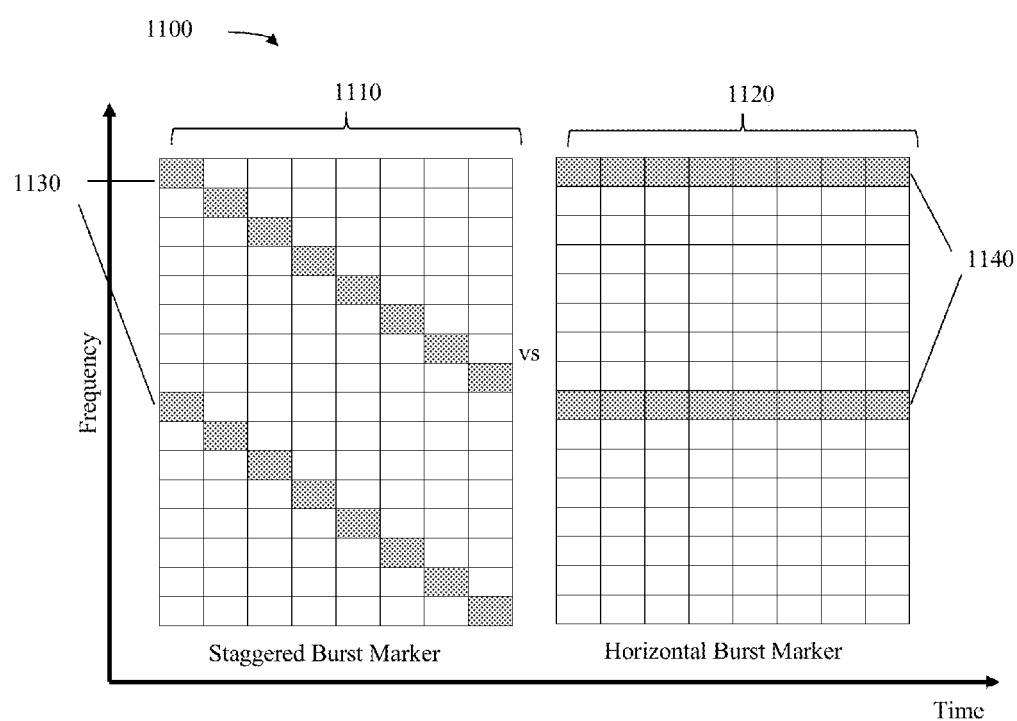
FIG. 11 is a schematic diagram of another embodiment of an OFDM frame view employing burst markers to separate downstream bursts.

FIG. 11 is a schematic diagram of another embodiment of a downstream OFDM frame view 1100 employing downstream burst markers to separate downstream bursts. In downstream OFDM frame view 1100, OFDM frame 1110 may comprise burst markers 1130 that may be staggered in frequency, while OFDM frame 1120 may comprise burst markers 1140 that may be positioned in the same sub-carrier across time. Burst markers that are staggered in frequency may provide performance improvement in the presence of frequency interferers.

Figure 12:
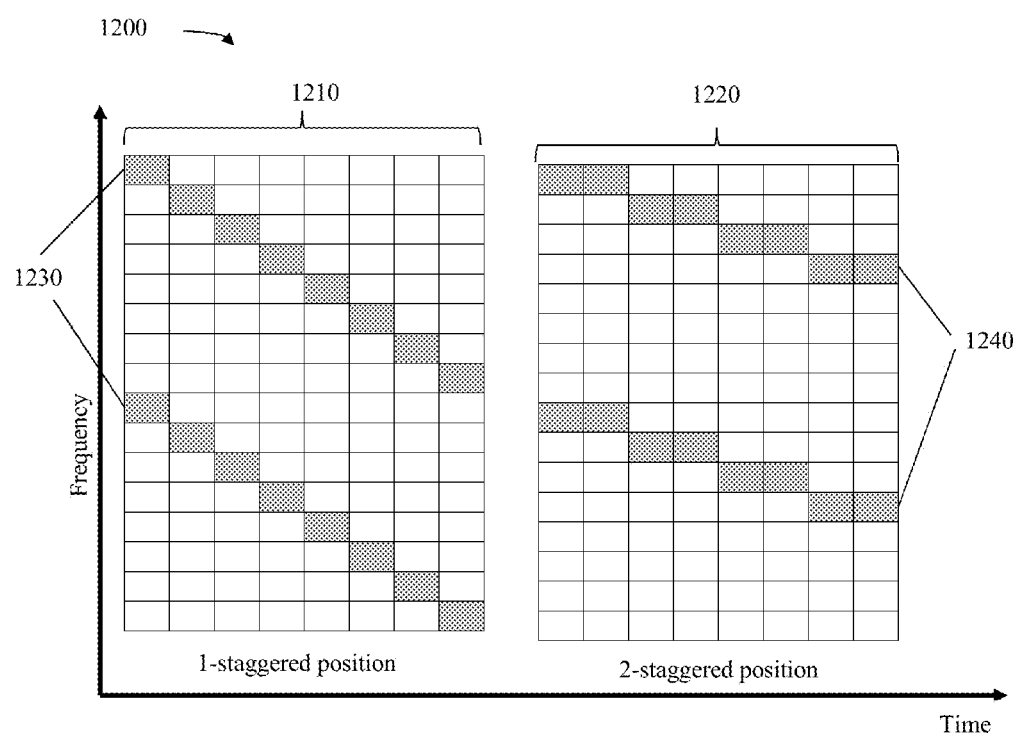
FIG. 12 is a schematic diagram of another embodiment of an OFDM frame view employing burst markers to separate downstream bursts.

FIG. 12 is a schematic diagram of another embodiment of a downstream OFDM frame view 1100 employing burst markers to separate downstream bursts. In downstream OFDM frame view 1200, OFDM frame 1210 may comprise burst markers 1230 that may be staggered with one staggered position, while OFDM frame 1220 may comprise burst markers 1240 that may be staggered with two staggered positions. It should be noted that burst markers may be staggered in 1 to N staggered positions, where N is the maximum number of sub-carriers required to construct a burst marker.

Figure 13:
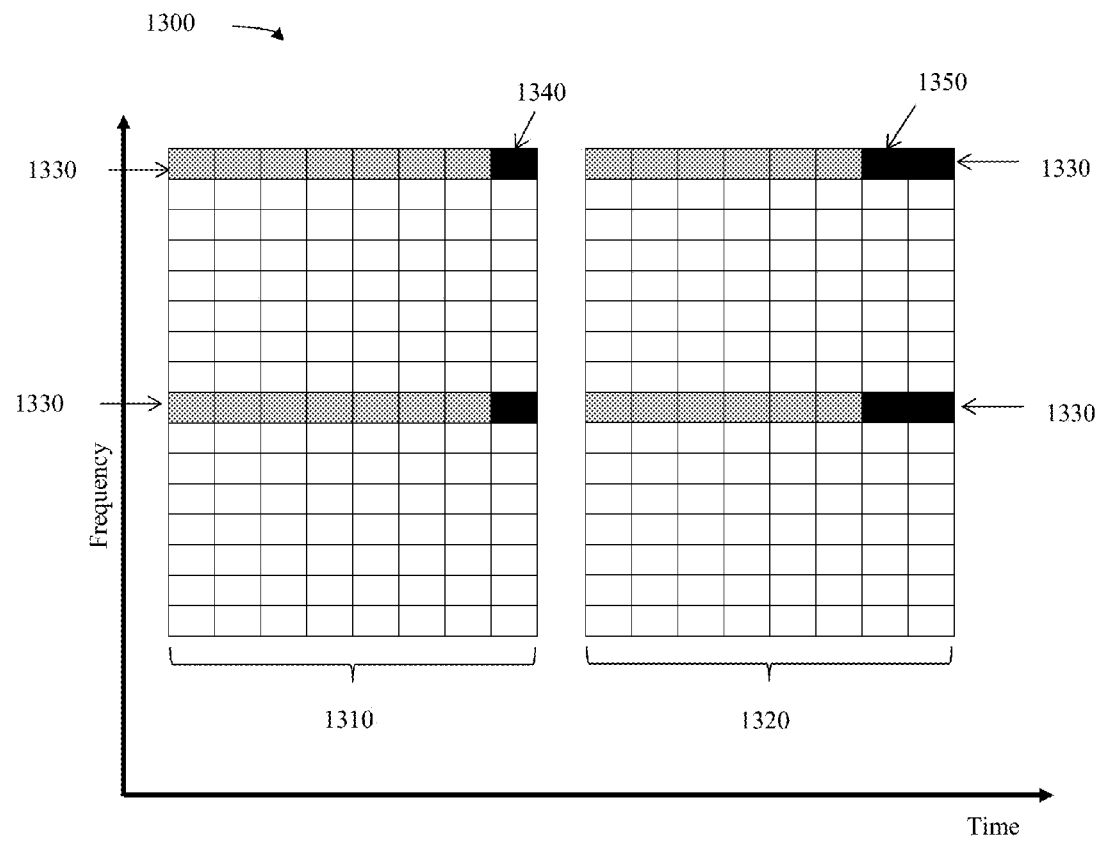
FIG. 13 is a schematic diagram of another embodiment of an OFDM frame view employing burst markers to separate downstream bursts.

FIG. 13 is a schematic diagram of another embodiment of a downstream OFDM frame view 1300 employing burst markers to separate downstream bursts. In downstream OFDM frame view 1300, each burst marker 1330 may comprise a CRC sequence 1340 or 1350 indicated by black colored blocks. In downstream OFDM frame view 1300, OFDM frame 1310 may employ burst markers 1330 protected by a CRC sequence 1340 carried in one sub-carrier, while OFDM frame 1320 may employ burst markers 1330 protected by a CRC sequence 1350 carried in two sub-carriers. It should be noted that the CRC sequences 1340 and 1350 may be inserted within a burst marker 1330 or appended at the end of a burst marker 1330. Burst markers 1330 may include any CRC sequence, such as an 8-bits CRC (CRC-8), a 16-bits CRC (CRC-16), or a 32-bits CRC (CRC-32).

Figure 14:
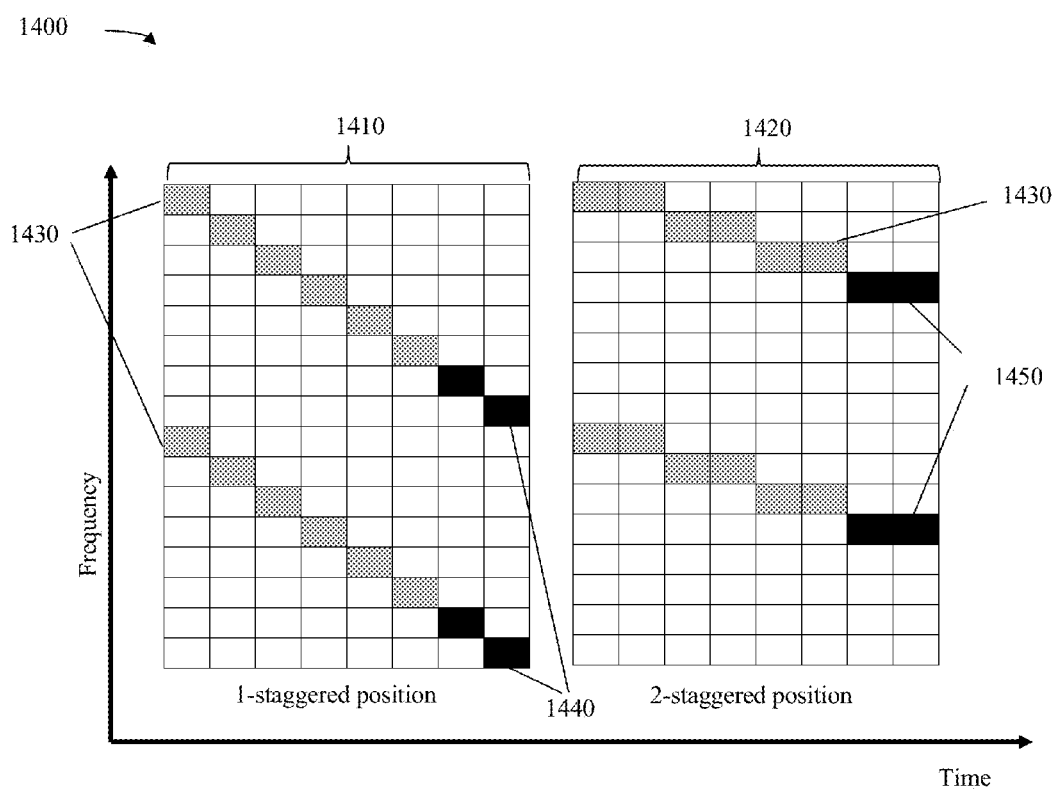
FIG. 14 is a schematic diagram of another embodiment of an OFDM frame view employing burst markers to separate downstream bursts.

FIG. 14 is a schematic diagram of another embodiment of a downstream OFDM frame view 1400 employing burst markers to separate downstream bursts. In downstream OFDM frame view 1400, OFDM frame 1410 may employ burst markers 1430 with CRC sequence 1440 positioned in one staggered position, while OFDM frame 1420 may employ burst markers 1430 with CRC sequence 1450 positioned in two staggered positions. Again, burst markers and CRC sequences may be staggered in 1 to N staggered positions, where N is the maximum number of sub-carriers required to construct a burst marker.

In another embodiment, a CLT or a FCU may generate a DL-MAP when forwarding downstream data received from an OLT. The CLT or FCU may group the downstream data based on MAC addresses or LLIDs in an OFDM frame and forward to the corresponding CNUs. Alternatively, an OLT located at a central office equipped with FCU functionalities may generate a DL-MAP directly when sending downstream bursts to ONUs.

Figure 15:
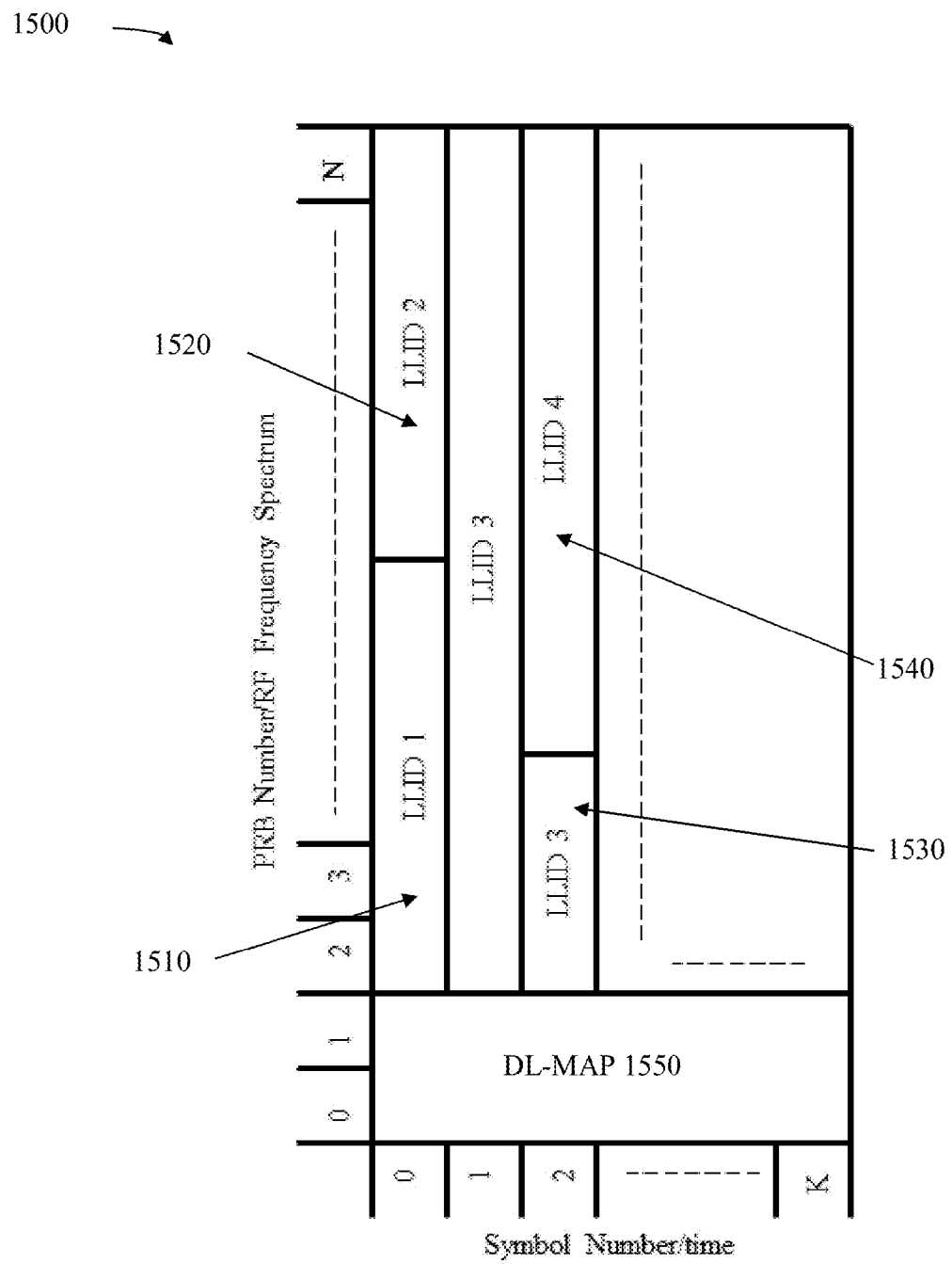
FIG. 15 is a schematic diagram of another embodiment of an EPoC downstream OFDM frame.
Figure 16:
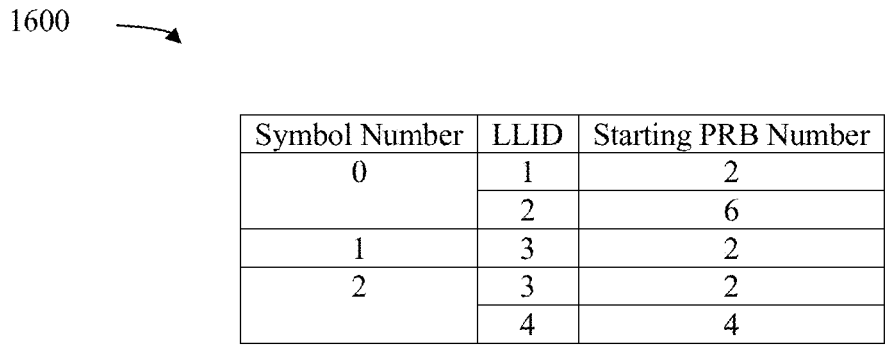
FIG. 16 is a table of an embodiment of a downlink resource mapping table corresponding to the downlink allocations of FIG. 15.

FIG. 15 illustrates an embodiment of an EPoC downstream OFDM frame 1500 comprising a DL-MAP 1550. OFDM frame 1500 may comprise K+1 symbols spanning in time and N+1 PRBs spanning in frequency. The number of PRBs may vary depending on channel bandwidth. For example, a 24 MHz channel may be configured with about 16 PRBs and a 120 MHz channel may be configured with about 80 PRBs. In OFDM frame 1500, DL-MAP 1550 may be located in the first two PRBs of each symbol in OFDM frame 1500. Thus, downstream data may be transmitted in the rest of the K×(N−1) PRBs. It should be noted that the position and/or size of a DL-MAP may vary and may be configured based on deployment scenario. OFDM frame 1500 may comprise downstream bursts 1510 for LLID 1, 1520 for LLID 2, 1530 for LLID 3, and 1540 for LLID 4. The starting symbol numbers and PRB numbers for the downstream bursts 1510-1540 are illustrated in table 1600 of FIG. 16.

Figure 17:
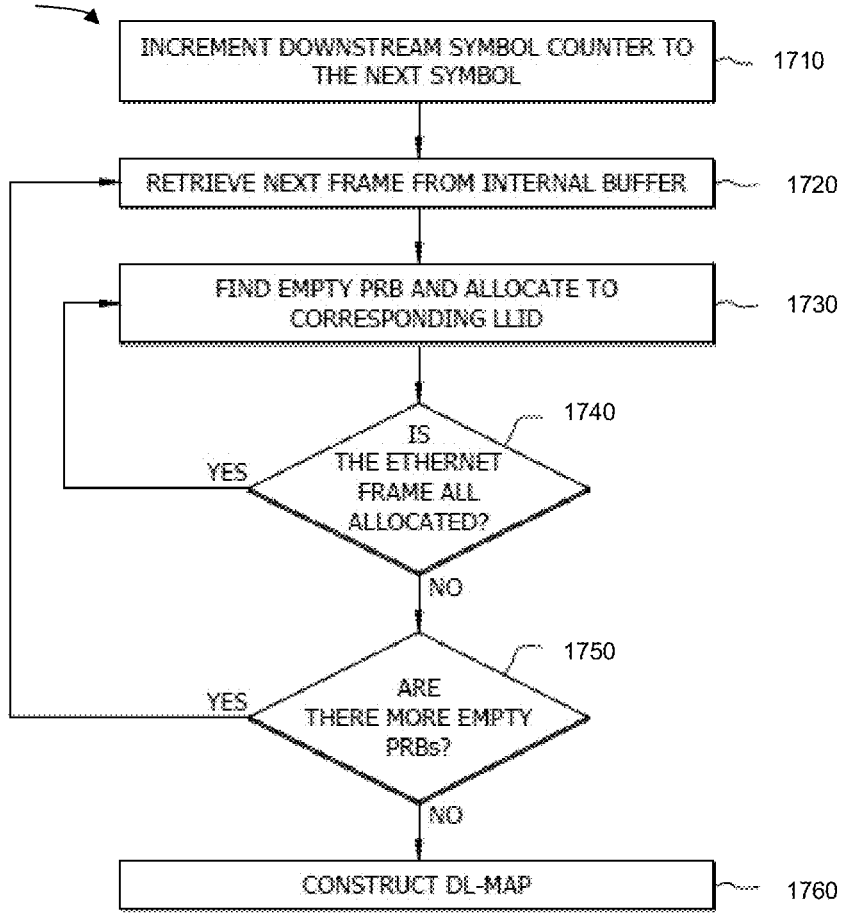
FIG. 17 is a flowchart of an embodiment of a DL-MAP generation method.

FIG. 17 illustrates an embodiment of a DL-MAP generation method 1700, which may be implemented on a FCU 120 and/or on a network element such as network element 200 and/or network element component such as downlink resource management module 233. The DL-MAP may specify downlink resources used for carrying data for different LLIDs in an OFDM downstream frame. At step 1710, method 1700 may increment a downstream symbol counter to point to the next downstream symbol. Next at step 1720, method 1700 may retrieve a frame from an internal frame buffer which may be queued based on LLIDs. Next at step 1730, method 1700 may search for an empty PRB and may allocate the empty PRB to the corresponding LLID. The loop in steps 1730 and 1740 may be continued until the length of the Ethernet frame is allocated. Once the allocation for the Ethernet frame is completed, the loop in steps 1720 to 1750 may be repeated for the next Ethernet frame in the buffer until all PRBs are exhausted. Finally, at step 1760, method 1700 may construct a DL-MAP according to the PRBs allocated to the LLID. The steps in method 1700 may be repeated for allocation downlink PRBs for other LLIDs.

An exemplary algorithm for the DL-MAP generation method 1700 of FIG. 17 is shown in algorithm 1800 of FIG. 18. Algorithm 1800 may be implemented at a FCU 120 or an OLT 110. Algorithm 1800 may be used to generate a DL-MAP. Algorithm 1800 may use system parameters such as current value of a downstream symbol counter (DSYM_COUNTER) at a FCU and the number of PRBs in a symbol (num_PRB). A bit loading table (bits_per_PRB) may be used to track the number of bits per PRB. When an allocation is completed for a LLID, the allocation may be stored in a DL-MAP (DL_MAP).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. An optical line terminal (OLT) comprising:
   an optical port configured to couple to an optical distribution network;
   a processor coupled to the optical port and configured to:
      generate a downlink map (DL-MAP) based on non-broadcast downstream bandwidth allocations for a plurality of network units and comprising one or more downlink grants corresponding to the non-broadcast downstream bandwidth allocations, wherein each of the non-broadcast downstream bandwidth allocations is not assigned to all of the network units, and wherein generating the DL-MAP based on the non-broadcast downstream bandwidth allocations comprises:
         determining a grant start time within an available downstream bandwidth, wherein the grant start time corresponds to a starting location in an Orthogonal Frequency Division Multiplexing (OFDM) frame, wherein the starting location comprises an OFDM symbol number and a sub-carrier number, wherein the OFDM symbol number corresponds to a value obtained from rounding a result of a division, wherein the sub-carrier number corresponds to a remainder of the division, and wherein the division comprises dividing the grant start time by an OFDM unit time;
         assigning a grant length according to a size of one of the non-broadcast downstream bandwidth allocations within the available downstream bandwidth, wherein the grant length corresponds to a number of sub-carriers for transmitting downstream data; and
         embedding the grant start time and the grant length in the one or more of the downlink grants;
      generate an Ethernet passive optical network (EPON) multi-point control protocol (MPCP) downstream gate message comprising the DL-MAP; and
      embed the DL-MAP in the EPON MPCP downstream gate message; and
   a transmitter coupled to the processor and the optical port, wherein the transmitter is configured to:
      transmit the EPON MPCP downstream gate message to the network units via the PON a passive optical network (PON); and
      transmit downstream data to the corresponding network units beginning at the grant start time for a duration of the grant length.

2. The OLT of claim 1, wherein the grant start time is in units of time quanta (TQ), wherein the OFDM unit time is a multiple of the TQs, and wherein the OFDM unit time comprises a time duration of an OFDM symbol and a cyclic prefix (CP).

3. The OLT of claim 1, wherein the network units are optical network units (ONUs) connected via the PON.

4. The OLT of claim 1, wherein the network units are coaxial network units (CNUs) connected to a coaxial electrical network coupled to the PON via a Fiber Coaxial Unit (FCU).

5. The OLT of claim 1, wherein scheduled downstream traffic associated with the downstream gate message is identified based on a Logical Link Identifier (LLID).

6. A method for managing downstream transmission in an Ethernet passive optical network (EPON) protocol over coax (EPoC) network comprising:
   generating, via a processor, a downlink map (DL-MAP) based on non-broadcast downstream bandwidth allocations for a plurality of network units, wherein each of the non-broadcast downstream bandwidth allocations is not assigned to all of the network units, wherein the DL-MAP comprises a downstream allocation for a Logical Link Identifier (LLID), multiple LLIDs, or a group of LLIDs, wherein the LLIDs comprise a tuple, wherein the tuple comprises a starting Orthogonal Frequency Division Multiplexing (OFDM) symbol number, a starting Physical Resource Block (PRB) number, and a number of PRBs allocated to the LLID, and wherein generating the DL-MAP based on the non-broadcast downstream bandwidth allocations comprises:
      determining, via the processor, the starting OFDM symbol number and the starting PRB number in an OFDM frame with available resources;
      assigning, via the processor, the number of PRBs according to a size of one of the non-broadcast downstream bandwidth allocations within the available resources; and
      inserting, via the processor, the tuple in the DL-MAP;
   generating, via the processor, an EPON multi-point control protocol (MPCP) frame comprising an EPON MPCP downstream gate message and a preamble field;
   inserting, via the processor, the DL-MAP in the preamble field; and
   sending, via a transmitter coupled to the processor, the EPON MPCP frame to the network units.

7. The method of claim 6, wherein continuous PRBs are assigned to the same LLID, the multiple LLIDs or the group of LLIDs.

8. The method of claim 6, wherein the network units are optical network units (ONUs) connected via a passive optical network (PON) or a coaxial network unit (CNU) connected to a coaxial electrical network coupled to the PON via a Fiber Coaxial Unit (FCU).

\* \* \* \* \*